United States Patent [19]
Naka et al.

[11] Patent Number: 5,583,975
[45] Date of Patent: Dec. 10, 1996

[54] IMAGE GENERATING APPARATUS AND METHOD OF GENERATING AN IMAGE BY PARALLEL PROCESSING THREAD SEGMENTS

[75] Inventors: Toshiya Naka; Yoshiyuki Mochizuki; Richard Doerksen, all of Osaka, Japan

[73] Assignee: Matsushita Electric Industrial Co., Ltd., Osaka, Japan

[21] Appl. No.: 186,807

[22] Filed: Jan. 24, 1994

[30] Foreign Application Priority Data

Jan. 22, 1993 [JP] Japan .................................... 5-008968

[51] Int. Cl.$^6$ ............................................. G06T 15/50
[52] U.S. Cl. ..................... 395/126; 395/124; 395/127; 395/132
[58] Field of Search ........................... 395/126, 127, 395/132, 123, 124

[56] References Cited

U.S. PATENT DOCUMENTS

| | | | |
|---|---|---|---|
| 4,928,250 | 5/1990 | Greenberg et al. | 364/518 |
| 4,945,500 | 7/1990 | Deering | 364/522 |
| 5,394,516 | 2/1995 | Winser | 395/119 |

FOREIGN PATENT DOCUMENTS 0511537   4/1992   European Pat. Off. .

OTHER PUBLICATIONS

Foley, "Computer Graphics: Principles and Practice, Second Edition," Addison–Wesley Publishing Co. Inc., pp. 887, 890, 899, 902.
Rosenberg, "Dictionary of Computers, Information Processing & Telecommunications, Second Edition," p. 102.
Foley et al, "Computer Graphics: Principles & Practice," 2nd Edition, 1990; pp. 701–715, 776–777.

*Primary Examiner*—Heather R. Herndon
*Assistant Examiner*—Anton W. Fetting
*Attorney, Agent, or Firm*—Price, Gess & Ubell

[57] ABSTRACT

An image generating apparatus used in the field of image processing such as Computer Graphics. The image generating apparatus comprises an input unit for setting data related to a shape of each polygon, an attribute-data-setting unit for setting physical-property attribute data of the polygons, a view-point-data setting unit for setting data related to a view point, a boundary-box-dividing unit for dividing a boundary box enclosing all the polygons into a set of voxels of equal-size with parameters for the boundary box and a linear conditional expression, a segment buffer for registering intersection data per segment for each light source consisting of a thread of a processor assigned for each segment on one polygon and a ray-intercepting polygon at the time of intensity computation per pixel, and an intensity computing unit for checking an intersection with the registered ray-intercepting polygon first when computing an adjacent pixel in the same segment.

9 Claims, 8 Drawing Sheets

IMAGE GENERATING APPARATUS AND METHOD OF GENERATING AN IMAGE BY PARALLEL PROCESSING THREAD SEGMENTS

BACKGROUND OF THE INVENTION

1. Field of the Invention

The present invention relates to an image generating apparatus used in the field of image processing such as CG (Computer Graphics) for generating a realistic image at a high speed, and to a method thereof.

2. Description of the Related Arts

There has been increasing demands for techniques to improve image qualities in the field of image processing such as CG (Computer Graphics). Accordingly, a variety of algorithms have been developed to generate a realistic image based on an object's physical phenomena, such as light reflection or transmission, Conventionally, methods called "Gouraud shading" and "flat-shading" are applied; however, methods called "radiosity" and "ray-tracing", which handle specular reflections and shadows caused by one object to the others in an arbitrary boundary box, have been developed recently.

"Radiosity" is a method to reproduce shadows by computing a thermal energy propagation per pixel. A form factor is computed by a process called "hemi-cube" which uses a technique called "z-buffering" or a process called "ray casting" which checks the intersection between a ray emanating from a light source and objects being modeled, or so-called polygons defining the objects' spatial-occupancies; the latter being an improvement of the former in the resulting image qualities.

"Ray-tracing" is a method to reproduce ray transmission and shadows by defining reflection and transmission factors of the object's surface, and thus this method is effective in reproducing an object with curved surfaces, such as an automobile, in a realistic image. The ray-tracing algorithms begin with "hidden-surface-removal": firstly, polygons enclosed in an arbitrary boundary box are projected on a screen as a 2D scene based on supplied data related to a view point as to its location, view direction, and zoom angle; secondly, a ray is fired from the center of the projection through each pixel on the screen to check the intersection between the ray and all the polygons in the arbitrary boundary box, and polygons that do not intersect with any other polygon relative to the rays are determined to be visible surfaces; finally, intensity on each pixel in the visible surfaces is computed by taking into account both a direct ray emanating from each light source and reflections from the other polygons.

Given that both methods compute the intensity on each pixel, the qualities in the resulting image are significantly improved. However, the computation per pixel involves a massive amount of computation, and thus it takes quite a long time, in particular, when only a single processor is equipped with the apparatus. The time can be saved by parallel-processing with a plurality of processors, but only limitedly due to a corresponding increase in expense for hardware. Therefore, along with the demands for improving the image qualities, the demands for a technique such that speeds up the intensity computation either by a serial- or parallel-processing have been increasing as well.

SUMMARY OF THE INVENTION

Accordingly, the present invention has an object to provide an image generating apparatus capable of computing intensity across visible surfaces with a lesser computation amount and without deteriorating the image qualities.

The present invention has another object to provide a rational method of computing the intensity used in the image generating apparatus.

The above objects are fulfilled by an image generating apparatus for generating a realistic 2D image using a 3D model constructed by a computer. The image generating apparatus comprises a 3D model dividing device for dividing a 3D model of an object into a plurality of polygons to define a spatial-occupancy of the 3D model, a light-source-data setting device for setting data related to at least one light source that illuminates the polygons, a view-point-data setting device for setting data related to a view point from which some of the polygons visible from the view point are observed, and an intensity computing device for computing intensity across the visible polygons with the use of the light source data and the view point data, wherein the intensity computing device includes a checking unit for dividing each polygon into a plurality of segments to check whether or not a ray emanating from the light source through a sample pixel selected sequentially from the pixels in each segment is intercepted by any other polygon, an intersection-data registering unit for registering data identifying the ray-intercepting polygon as intersection data each time such a ray-intercepting polygon is checked by the checking unit for the sample pixel, a checking control unit for checking ray-interception by the registered polygons for the sample pixel by the checking unit for a first pixel other than the sample pixel first to select a second pixel other than the sample and first pixels by skipping the ray-interception check for the first pixel when a ray emanating from the light source through the first pixel is also intercepted by any of the registered ray-intercepting polygons, and then to check the ray-interception check by non-registered polygons for the first pixel when the ray emanating from the light source through the first pixel is not intercepted by any of the registered polygons, and a ray-tracing unit for tracing a reflection of a second order from the sample pixel when the checking unit checks no ray-intercepting polygons relative to the sample pixel.

The checking unit may divide the polygon into a set of the segments along a scan line to select an adjacent pixel one after another from the pixels along the scan line.

The intersection-data registering unit may include a segment buffer which registers the intersection data per segment.

The intersection-data registering unit may generate the intersection data per segment for each light source to register the generated data.

The intersection-data registering unit may include an updating unit for updating the intersection data each time a new ray-intercepting polygon is checked during the ray-interception check by the checking unit for one segment.

The segment buffer may comprise a set of threads assigned with their respective identification codes to store the intersection data of each segment into a thread identified by their respective identification codes, whereby the intersection data of each segment on one polygon are processed in parallel by a plurality of processors equipped with the image generating apparatus.

The image generating apparatus may comprise an intersection checking device for checking the polygons of the 3D model to find a polygon which is not illuminated by any light source, wherein the checking unit in the intensity computing device checks the polygons other than the unilluminated polygons checked by the intersection checking device.

The intersection checking device may include a boundary box dividing unit for dividing a boundary box enclosing all the polygons into a plurality of voxels, the boundary box dividing unit being characterized in that it determines the number of division for the boundary box using a total number of the polygons, a mean size of the polygons, and a size of the boundary box as parameters, and an intersection checking unit for checking an intersection between the voxels relative to the light source.

The image generating apparatus may further comprise an attribute-data setting device for setting data related to a physical-property attribute including a reflection factor and a transmission factor of each polygon, wherein the intersection checking device checks the intersection between the polygons relative to the light source by taking into account the physical-property of each polygon, the intensity computing device checks the ray-intercepting polygons by taking into account the physical-property attribute of the ray-intercepting polygons, and the ray-tracing unit traces the reflection of the second order by taking into account the physical-property attribute of the polygons located in a direction in which the ray reflects.

The above objects are fulfilled by a method of computing intensity across the visible polygons in an image generating apparatus for generating a realistic 2D image from a 3D model, comprising a 3D model dividing device for dividing a 3D model of an object into a plurality of polygons to define a spatial-occupancy of the 3D model, a light-source-data setting device for setting data related to at least one light source illuminating the polygons, a view-point-data setting device for setting data related to a view point from which some of the polygons visible from the view point are observed, an intensity computing device for computing intensity across the visible polygons with the use of the light source data and the view point data. The method of computing intensity across the visible polygons comprises the steps of dividing each polygon into a plurality of segments to select a first sample pixel in each segment to check whether there is any other polygon that intercepts a ray emanating from the light source through the first sample pixel, registering data identifying the ray-intercepting polygon in a segment buffer when such a ray-intercepting polygon is checked, selecting a second sample pixel from each segment to check whether any of the polygons registered in the segment buffer intercept a ray emanating from the light source through the second sample pixel to select a pixel adjacent to the second sample pixel by skipping the ray-interception check for the second sample pixel when any of the registered polygons intercept the ray, checking whether any of the non-registered polygons intercepts the ray emanating from the light source through the second sample pixel when none of the registered polygons intercept the ray to register data identifying the polygons checked as to be the ray-intercepting polygons for the second sample pixel in the segment buffer, and tracing a reflection of a second order from any of the sample pixels when no ray-intercepting polygons are checked.

The above objects are also fulfilled by an image generating apparatus for generating a realistic 2D image using a 3D model constructed by a computer. The image generating apparatus comprises a 3D model dividing device for dividing a 3D model of an object into a plurality of polygons to define a spatial-occupancy of the 3D model, a light-source-data setting device for setting data related to at least one light source that illuminates the polygons, an intersection checking device for checking the polygons of the 3D model to find a polygon which is not illuminated by any light source, and an intensity computing device for computing intensity across visible polygons by one of a ray tracing method and a radiosity method with the use of the light source data and the view point data, wherein the intersection checking device includes a boundary box dividing unit for dividing a boundary box enclosing all the polygons into a plurality of voxels, the boundary box dividing unit being characterized in that it determines the number of division for the boundary box using a total number of the polygons, a mean size of the polygons, and a size of the boundary box as parameters, and an intersection checking unit for checking an intersection between the voxels relative to the light source.

The above objects are also fulfilled by an image generating apparatus comprising a shape input device for dividing an object into a set of polygons to define a spatial-occupancy of the object, a view-point-data setting device for setting data related to a view point from which the polygons inputted with the shape input device are observed, an attribute-data-setting device for setting data related to a physical-property attribute of each polygon, a light-source-data setting device for setting data related to a light source illuminating the polygons, an intersection checking device for checking an intersection between the polygons supplied from the shape input device relative to the light source, an intensity computing device for computing intensity across each polygon by using the polygon's physical-property attribute data when no ray emanating from the light source through the polygon is intercepted by any other polygons, and a segment buffer for registering data related to the intersection of an arbitrary polygon for each light source.

The image generating apparatus may further comprise a display device for displaying only the visible polygons seen from the light source based on a result of the intersection-check by the intersection checking device.

The above objects are fulfilled by an image generating apparatus comprising a shape input unit for dividing an object into a set of polygons to define a spatial-occupancy of the object, a view-point-data setting unit for determining data related to a view point from which the polygons inputted with the shape input unit are observed, an attribute-data setting unit for setting data related to a physical-property attribute of each polygon, a light-source-data setting unit for setting data related to a light source illuminating the polygons, an intersection checking device for checking an intersection between the polygons supplied from the shape input device relative to the light source, and an intensity computing device for computing intensity across each polygon by using the polygon's physical-property attribute data when no ray emanating from the light source through the polygon is intercepted by any other polygons, wherein the intersection checking unit is characterized in that it creates a boundary box enclosing all the objects prior to the intersection-check for an arbitrary polygon, divides a screen created by the view-point-data setting unit into a set of rectangles of equal-size, checks the intersection between a ray emanating from the light source and a sample point in each rectangle on the screen, counts a number of the polygons that intersect with the ray in the boundary box, and further divides each rectangle into a set of smaller rectangles when the counted number is larger than a mean value of the polygons obtained by dividing a total number of the polygons by a total number of the rectangles, and combines adjacent rectangles when the counted number is smaller than the mean value.

The intersection checking unit may be characterized in that it subdivides each rectangle by $2^n$.

The above objects are also fulfilled in an image generating apparatus comprising a shape input unit for dividing an object into a set of polygons to define a spatial-occupance of the object, a view-point-data setting unit for determining data related to a view point from which the polygons inputted with the shape input unit are observed, an attribute-data-setting unit for setting data related to a physical-property attribute of each polygon, a light-source-data setting unit for setting data related to a light source illuminating the polygons, an intersection checking device for checking an intersection between the polygons supplied from the shape input device relative to the light source, and an intensity computing device for computing intensity across each polygon by using the polygon's physical-property attribute data when no ray emanating from the light source through the polygon is intercepted by any other polygons, wherein the intersection checking unit is characterized in that it creates a boundary box enclosing all the objects prior to the intersection-check for an arbitrary polygon, computes optimal conditions for dividing the boundary box for the intersection-check using a total number of the polygons within the boundary box, a mean area of the polygons, and a size of the boundary space as parameters, and determines a number of the division for the boundary box with optimal coefficients computed in advance with a plurality of experimental scenes under a specific condition obtained as a result of the experiments.

The above objects are also fulfilled by a method of generating an image characterized in that when computing intensity on one segment in an arbitrary polygon to check an intersection between polygons relative to one view direction, if a result of the intersection-check shows that a ray emanating from a light source through a sample pixel on the segment is intercepted by any other polygon, an identification code assigned to a processor that has computed the intensity on the sample pixel and an identification code for each of the ray-intercepting polygons are registered in a segment buffer relative to each light source.

The above objects are fulfilled by a method of generating an image characterized in that when computing a propagation of a thermal energy between polygons in a boundary box independent of a view point by using a segment buffer, an intersection between a sample pixel and a ray emanating from a light source through the sample pixel and an intersection between a pixel on a segment adjacent to a segment of the sample pixel and a ray emanating from the light source through the pixel are checked in parallel, and that a polygon whose pixels are totally shadowed by any other polygon is eliminated from a list of polygons subject to a display.

The above objects are also fulfilled by a method of generating an image by creating a boundary box enclosing all objects when checking an intersection between an arbitrary polygon and a ray emanating from a light source, a process of dividing the boundary box. The method is characterized in that it comprises the steps of dividing a screen on which the object is projected into a set of rectangles of equal-size, checking an intersection between a sample point in each rectangle on the screen and a ray emanating from a light source through the sample point, counting a number of the polygons that intersect with the ray in the boundary box, and further dividing the boundary by a larger number of division when the counted number is larger than a mean value of the polygons obtained by dividing a total number of the polygons by a total number of the rectangles, and combines adjacent rectangles when the counted number is smaller than the mean value.

The intersection checking unit may be characterized in that it subdivides each rectangle by $2^n$.

The above objects are also fulfilled by a method of generating an image by creating a boundary box enclosing all objects when checking an intersection between an arbitrary polygon and a ray emanating from a light source, a process of dividing the boundary box. The method is characterized in that it comprises the steps of computing optimal conditions for dividing the boundary box for the intersection-check using a total number of the polygons within the boundary box, a mean area of the polygons, and a size of the boundary space as parameters, and determining a number of the division for the boundary box with optimal coefficients computed in advance with a plurality of experimental scenes under a specific condition obtained as a result of the experiments.

BRIEF DESCRIPTION OF THE DRAWINGS

These and other objects, advantages and features of the invention will become apparent from the following description thereof taken in conjugation with the accompanying drawings which illustrate specific embodiments of the invention. In the drawings.

DESCRIPTION OF THE PREFERRED EMBODIMENTS

First Embodiment

Figure 1:
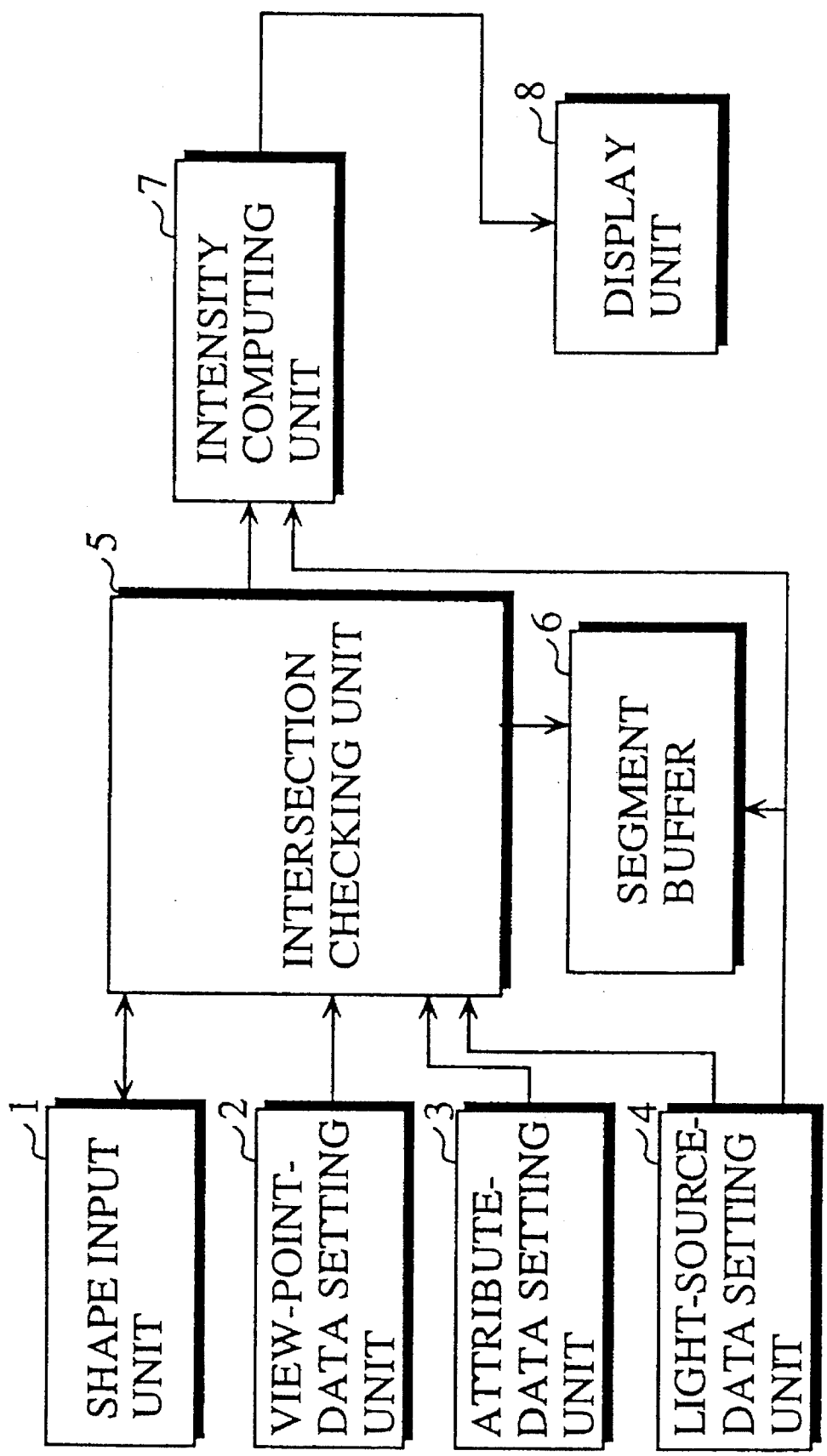
FIG. 1 is a block diagram of an image generating apparatus in accordance with the first embodiment of the present invention.

FIG. 1 depicts the structure of an image generating apparatus in accordance with the first embodiment of the present invention.

The image generating apparatus comprises the following components: a shape input unit 1 for receiving input data; a view-point-data setting unit 2; an attribute-data-setting unit 3; a light-source-data setting unit 4; an intersection checking unit 5 for checking intersection conditions; a segment buffer 6 for registering intersection data; an intensity computing unit 7 for computing intensity across a polygon; and a display unit 8 for displaying an image.

The shape input unit 1 includes: an object-data input unit for inputting objects to be modeled for an image display; a first division-processing unit for dividing each inputted object into a set of polygons; and a register unit for registering data as to a location in a boundary box and a shape of each polygon. The location data are registered in a scenetree-structure, while the shape data a list-structure, or a hierarchial structure, which is simply referred to as the list hereinafter. The shape data consist of world coordinates (x, y, z) of the vertices of each polygon and mapping coordinates (u, v) on which the polygon maps. The location and shape data of the polygons registered in the register unit are read out by the intersection checking unit 5, which checks the intersection between the polygons relative to a view point to determine the polygons illuminated by no light sources with the result of the intensity-computation by the intensity computing unit 7; the unilluminated polygons are eliminated from the list in the shape unit 1.

The view-point-data setting unit 2 includes: a view-point-data input unit for inputting data as to a view point such as its location, view direction, and zoom angle, from which the polygons in the boundary box are observed; and a view-point data-storage unit for storing the inputted view point data. The view point data, which correspond to the view point's location in hidden-surface-removal programs using the "ray tracing", are supplied to the intersection checking unit 5.

The attribute-data setting unit 3 includes: an attribute-data input unit for inputting physical-property attribute data as to a reflection factor or a transmission factor of each polygon; and an attribute-data storage unit for storing the physical-property attribute data. The physical-property attribute data are supplied to the intensity computing unit 7 by the intersection checking unit 5 for the intensity-computation using the "ray tracing" or "radiosity".

The light-source-data setting unit 4 includes: a light-source-data input unit for inputting data as to each light source that illuminates the boundary-box, such as its intensity, location, attenuation, and distribution of light energy; an identification-code attaching unit for attaching an identification code assigned to each light source; a light-source-data storage unit for storing the light source data; a storing unit for storing the light-source-identification codes into the segment buffer 6; and a first data-delivering unit for delivering the light-source-identification codes and light source data to both the intersection checking unit 5 and intensity computing unit 7.

The intersection checking unit 5 includes: a registered-data reading out unit for reading out the polygons' location and shape data from the shape input unit 1; a view-point-data reading out unit for reading out the view point data from the view-point-data setting unit 2; a second data-delivering unit for delivering the polygons' location and shape data and view point data read out from their respective setting units to the intensity computing unit 7; a third data-delivering unit for delivering the physical-property attribute data read out from the attribute-data setting unit 3 to the intensity computing unit 7; a first receiving unit for receiving the light source data from the light-source-data setting unit 4; a first boundary-box dividing unit for dividing a boundary box into a set of voxels of equal-size; a first checking unit for checking the intersection between the polygons relative to the view point; a second receiving unit for receiving a rendering-start command; a readout-data storing unit for storing the data related to the polygons read out by the registered-data reading out unit into the segment buffer 6 by attaching an identification code to each polygon; and a fourth data-delivering unit for delivering the data related to the polygons determined as being the visible polygons by the intersection checking unit 5 to the intensity computing unit 7 by attaching an identification code to each visible polygon.

More precisely, the first boundary-box dividing unit divides the boundary box into a set of voxels of equal-size by referring to the world coordinates (x, y, z) contained in the polygons' location data read out by the registered-data reading out unit.

The first checking unit determines the visible polygons based on the their shape data read out by the registered-data reading out unit and the light source data received by the first receiving unit as well as the voxels formed by the first boundary-box dividing unit.

The segment buffer 6 registers intersection data supplied from the intensity computing unit 7. For example in FIG. 2, assume that a ray emanating from a light source 30 through a sample pixel 24 on a scan line, or a segment 22, on a polygon 21 is intercepted by another polygon, then intersection data 27 stores a thread identification code 25 for a processor 1 that has computed the intensity on the pixel 24, and a ray-intercepting-polygon identification code 26. The intersection data 27 may store the identification codes assigned to all the polygons that are illuminated by the light source. Likewise, intersection data 28 store the identification codes 25 and 26 with respect to a pixel 25. Note that the intensity computing unit 7 computes the intensity on all the segments on the polygon 21 in parallel in this embodiment, the intensity computing unit 7 may eliminate the intersection data for the segments on the polygon 21 registered in the segment buffer 6 when it has computed the intensity across the polygon 21.

The intensity computing unit 7 includes: a data receiving unit for receiving the polygons' location and shape data, view point data, attribute data read out from the shape input unit 1, view-point-data setting unit 2, and attribute-data setting unit 3, respectively by the intersection checking unit 5; a light-source-data receiving unit for receiving the light-source-identification code and light source data from the light-source-data setting unit 4; a first computing unit for computing the intensity across each polygon; a registration eliminating unit for eliminating the polygons determined as being illuminated by no light sources by the first computing unit from the list in the shape input unit 1; a second boundary-box dividing unit for dividing the boundary box into a set of voxels of equal-size by referring to the world coordinates contained in the polygons' location data delivered from the intersection checking unit 5; a second checking unit for checking the visible polygons by checking the intersection between the polygons relative to the view point using the voxels and based on the view point data delivered from the intersection checking unit 5; a hidden-surface processing unit for removing hidden-surfaces with the view point data received by the data receiving unit; an intensity-mapping unit for mapping the intensity on the pixels on each polygon calculated by the intensity computing unit 7 for each light source to obtain the intensity in the boundary box mapped in one 2D scene; a fifth data-delivering unit for delivering the data obtained by the intensity mapping unit to the display 8.

Figure 2:
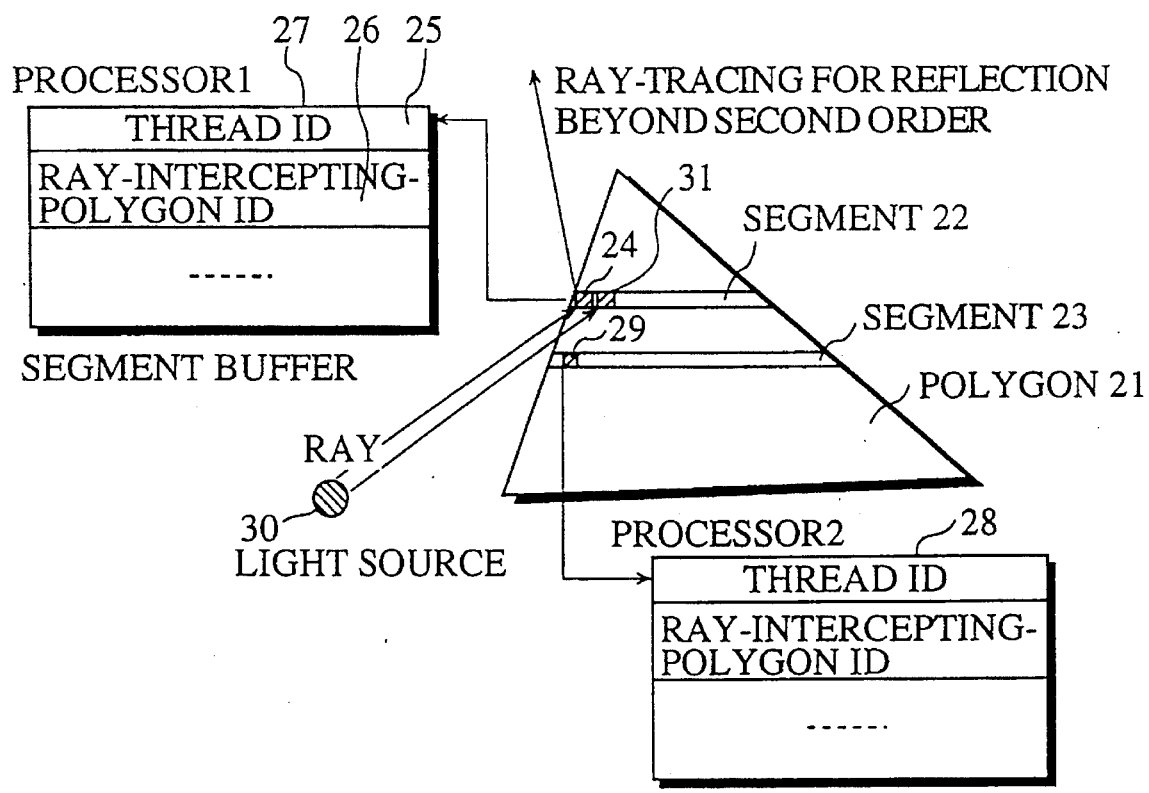
FIG. 2 is a view explaining the intensity computing operation by an intensity computing unit and intersection data registered in a segment buffer.

More precisely, the first computing unit includes: a polygon-dividing unit for dividing each polygon into a set of segments as is shown in FIG. 2; a thread assigning unit for assigning the threads of plurality of the processors to their respective segments; a second computing unit for computing intensity on a sample pixel such as the pixels 24, 29 in the segments 22, 23 based on the light source data received by the light-source-data receiving unit and the polygons' location and shape data and the physical-property attribute data received by the data receiving unit; a check-result registering unit for registering the intersection data into the segment buffer 6—for example, when the rays emanating from the light source 30 through the pixels 24, 29 are intercepted by any other polygon and the intensity computing unit 7 computes a 0-intensity, the thread identification codes 25 and ray-intercepting-polygon identification codes 26 relative to pixels 24, 29 are registered as the intersection data 27, 28, respectively; a registration updating unit for updating the intersection data; and a referring unit for referring the intersection data registered in the segment buffer 6 by reading them out for the intensity-computation for an adjacent pixel.

The display unit 8 includes: an intensity-data receiving unit for receiving the data obtained by the intensity computing unit 7; a display control unit for converting the received data into pixel data for the display; and an image display unit for displaying a rendered image under the control of the display control unit.

The operation of the above-constructed image generating unit will be explained with referring to FIGS. 2–5.

Figure 3:
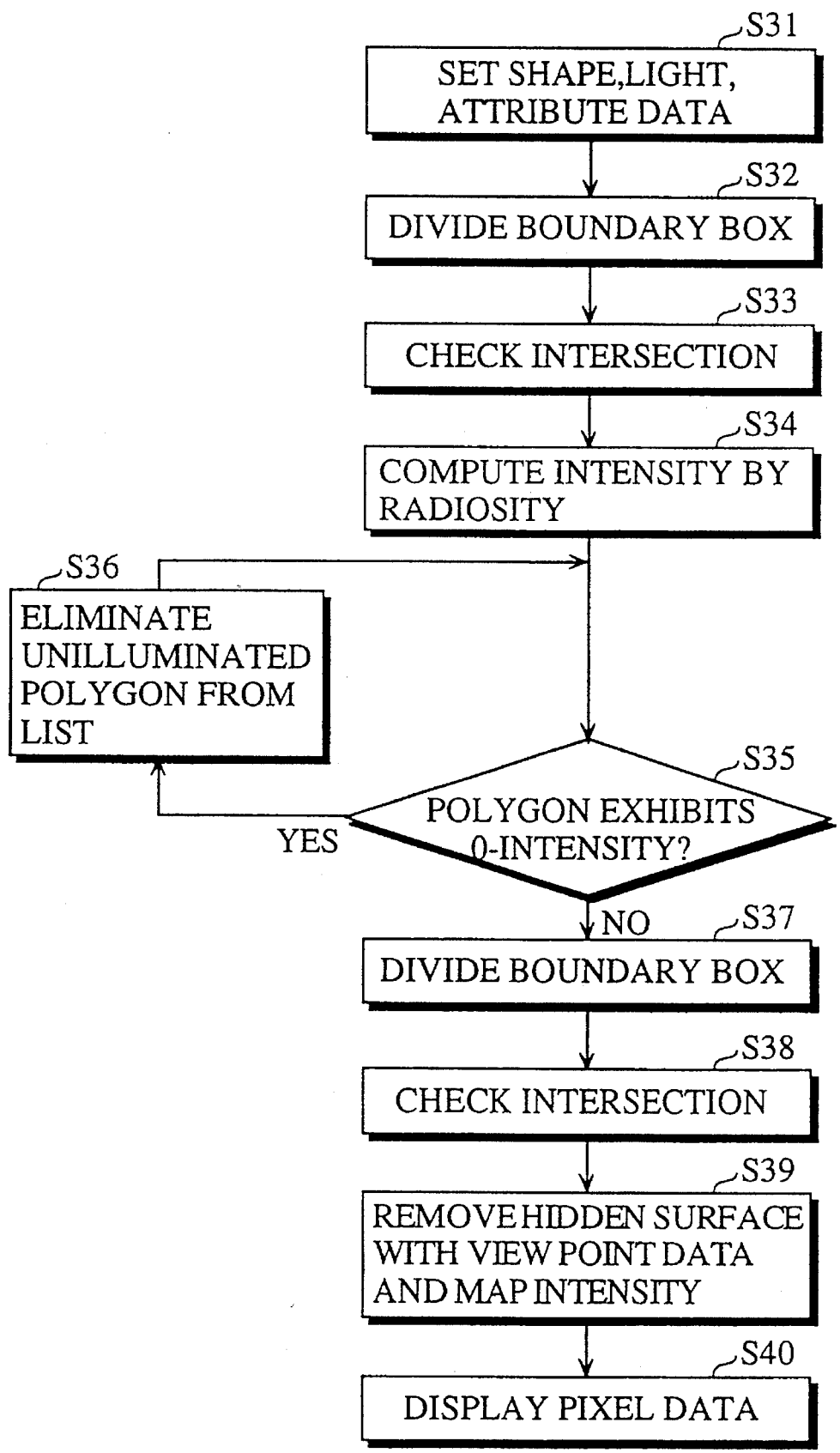
FIG. 3 is a flowchart detailing a process called "rendering" used in the first embodiment.
Figure 4:
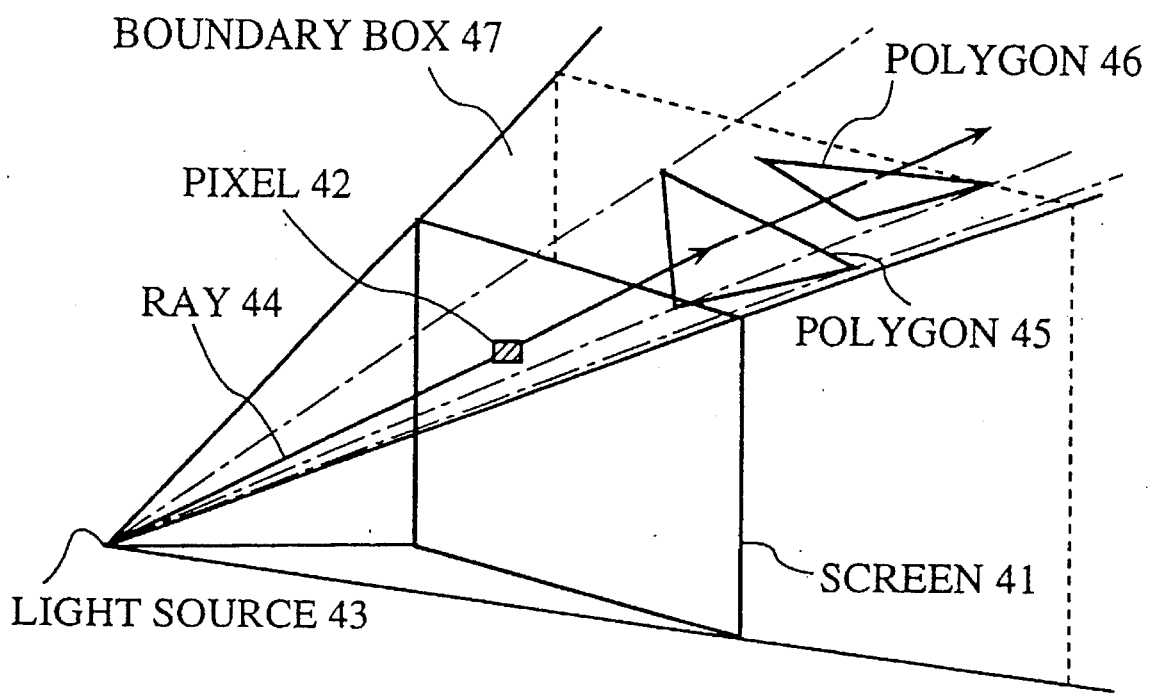
FIG. 4 is a view explaining the intersection-check operation by an intersection checking unit.

FIG. 3 is a flowchart detailing a process called "rendering", and FIG. 4 is a view explaining the intersection-check between the polygons relative to the view point although the view of the voxels is omitted therein.

To begin with, an operator inputs the object data, attribute data, and light source data into the shape input unit 1, attribute-data setting unit 3, and light-source-data setting unit 4, respectively (Step 31).

Upon the receipt of the rendering-start command, the intersection checking unit 5 divides a boundary box 47 into a set of voxels of equal-size (Step 32), and checks the intersection between polygons 45, 46 relative to a light source 43 (Step 33). To be more specific, a screen 41 is formed to project the boundary box set by the intersection checking unit 5 a 2D scene, and a ray is fired from each light source through a sample pixel 42 on the screen. As a result, the polygon 46 is enclosed by two alternate long and short dash lines emanating from the light source 43 and passing through the edge's end points of the polygon 45. This means that the ray emanating from the light source 43 through the polygon 46 is totally intercepted by the polygon 45.

When there are a plurality of light sources, the intersection checking unit 5 checks the intersection between the polygons relative to each light source (Step 33).

Figure 5:
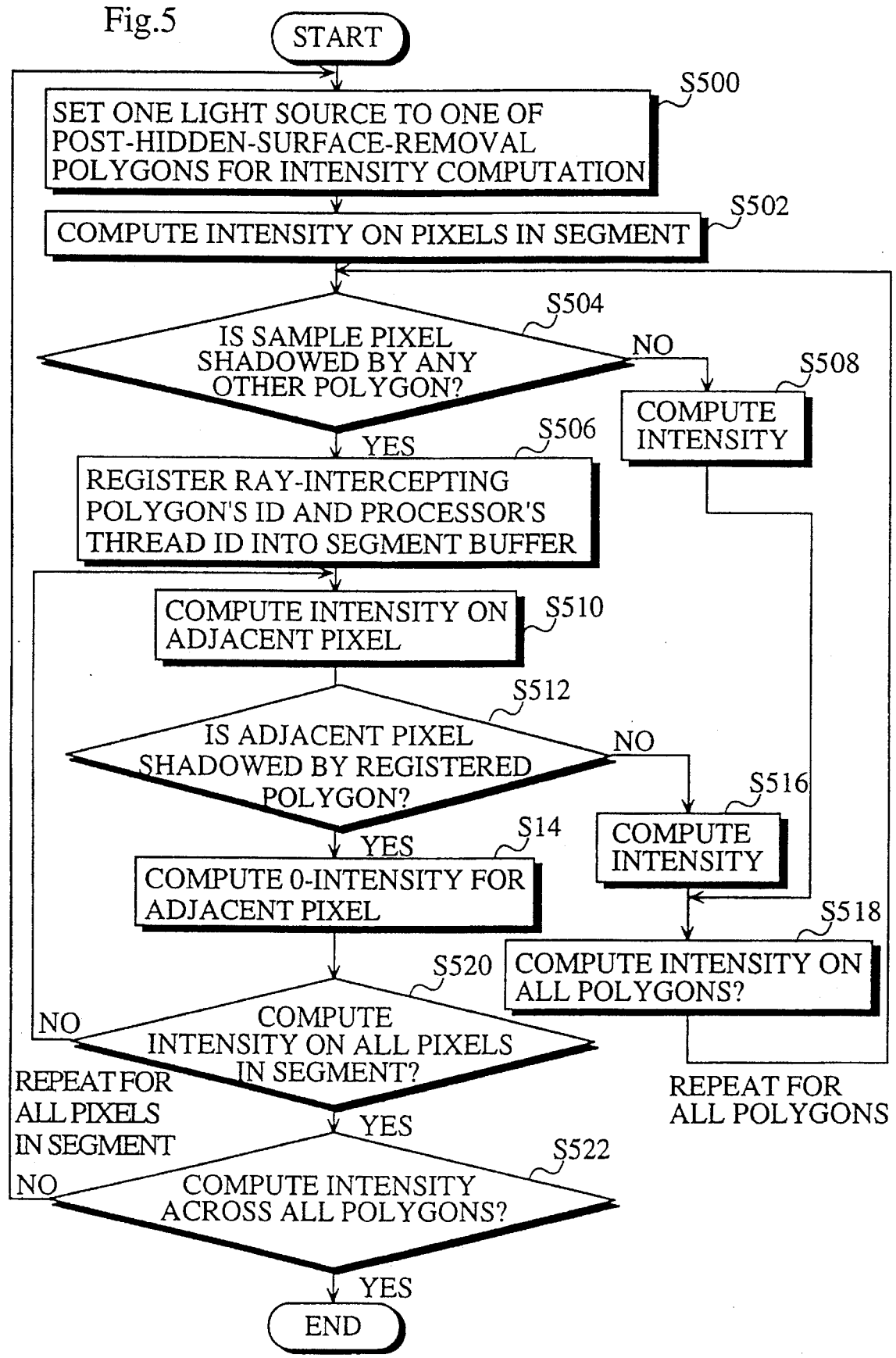
FIG. 5 is a flowchart detailing the operation of the intensity computing unit.

When Step 33 is repeated as many times as the number of light sources, the intensity computing unit 7 computes the intensity across each visible polygon with "radiosity" (Step 34), which will be detailed by the flowchart in FIG. 5 and the view in FIG. 2.

To compute the intensity across post-hidden-surface-removal polygons, or the visible polygons, the intensity computing unit 7 sets the single light source 30, and computes the intensity on each segment on the polygon 21 first (Step 500). For example, the segments 22, 23 are assigned with the threads of their respective processors 1, 2, so that the intensity computing unit 7 computes the intensity on all the segments on the polygon 21 in parallel, making uniform loading distribution possible.

To be more specific, the intensity computing unit 7 computes the intensity on the sample pixel 24 on the segment 22 and the sample pixel 29 on the segment 23 relative to the light source 30 using the processors 1, 2, respectively (Step 502). Then, the intensity computing unit 7 checks whether the pixel 24 is shadowed by any other polygons or not (Step 504): the pixel 24 exhibits the 0-intensity when it is shadowed by any other polygon, and accordingly, the intensity computing unit 7 registers the intersection data 27 consisting of the thread-identification code 25 and ray-intercepting-polygon identification code 26 into the segment buffer 6 (Step 506); the pixel 24 exhibits a value other than 0 as a result of the computation with the physical-property attribute data and light source data when the ray is not intercepted by any other polygon, and accordingly, the intensity computing unit 7 performs the "ray-tracing" for the reflections beyond the second order (Step 508) to proceed to Step 518.

Subsequently, the intensity computing unit 7 computes the intensity on a pixel adjacent to the sample pixel, for example, a pixel 31 on the segment 22 (Step 510). The intensity computing unit 7 reads out the intersection data 27 from the segment buffer 6 to check whether any of the ray-intercepting polygons for the pixel 24 also intercepts a ray emanating from the light source 30 through the pixel 31 (Step 512). If the pixel 31 is also shadowed by any of the registered light-intercepting polygons, the intensity on the pixel 31 exhibits the 0-intensity and the intensity computing unit 7 does not perform the "ray-tracing" for the reflections beyond the second order; otherwise, the "ray tracing" for the reflections beyond the second order is performed as is in Step 508, but only when the pixel 31 is not shadowed by any other non-registered polygon either (Step 516). Subsequent to Steps 508, 516, the intensity computing unit 7 returns to Step 504 to compute the intensity on all the pixels in each segment sequentially by preceding to the right in the drawing.

Accordingly, the intensity computing unit 7 checks whether it has computed the intensity on all the pixels in the segments or not (Step 520). If not, the program returns to Step 510; otherwise, the program proceeds to Step 522, where the intensity computing unit 7 checks whether it has computed the intensity across all the polygons or not; if yes, it terminates the intensity-computation; otherwise, it returns to Step 500 to compute the intensity across a following polygon.

With the operations explained thus far, the intensity on each pixel on all the polygons relative to the single light source 30 is computed. The intensity on each pixel on all the polygons relative to all the light sources will be computed by repeating the above operations as many times as the number of the light sources.

When the intensity computing unit 7 completes the intensity-computation with "radiosity" (Step 34), it checks whether or not each polygon exhibits the 0-intensity showing that the polygon is totally shadowed by one or more other polygons (Step 35). Accordingly, the intensity computing unit 7 eliminates such a polygon exhibiting the 0-intensity from the list in the shape input unit 1 (Step 36). Further, the intensity computing unit 7 divides the boundary box into a set of voxels of equal-size (Step 37), and checks the intersection between the polygons relative to the view point based on the view point data while removing the hidden-surfaces (Step 38). Subsequently, the intensity computing unit 7 performs a process called "intensity mapping" by convoluting the intensity on each pixel relative to each light source (Step 39), and the display control unit 8 converts the resulting data into the pixel data to display the rendered image (Step 40).

The threads of the processors are assigned to their respective segments for the parallel-processing in Step 500; however, one segment may be divided by a plurality groups of pixels, so that each of the threads are assigned to their respective groups. Also, a thread of a single processor may be assigned to a plurality of segments.

As well, a single processor may be used for a serial-processing to keep the apparatus compact. Although the speed is decreased compared with this embodiment, but yet increased significantly compared with the conventional method.

Although the intersection checking unit 5 checks the unilluminated polygons, it may check invisible polygons that are not seen from the view point.

In addition, the intensity computing unit 7 may skip Step 32 through Step 35 and compute the intensity with "ray-tracing" in Step 39, where the intensity is mapped.

Second Embodiment

Figure 6:
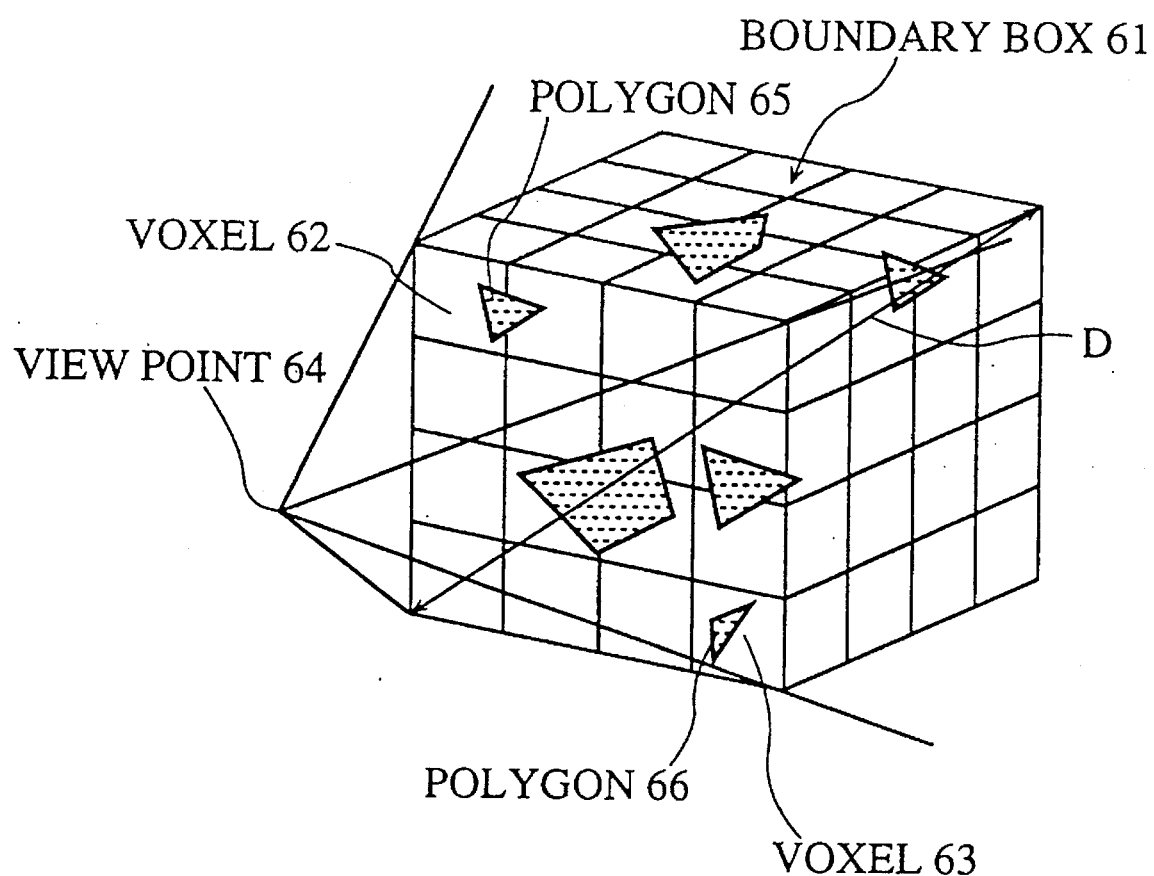
FIG. 6 is a perspective view explaining the boundary-box-dividing operation by an intersection checking unit and an intensity computing unit of the second embodiment.

An image generating apparatus in accordance with the second embodiment of the present invention will be explained with referring to FIG. 6.

In general, objects placed at a great distance from each other will not intersect relative to the view point in the boundary box created for the "rendering" to enclose all the polygons being projected in the scene. Thus, these objects may not comply with the intersection conditions in some cases. Such objects can be checked at a high speed when the boundary box is divided into a set of voxels of equal-size in advance to check the intersection between the voxels relative to the view point. FIG. 6 shows an example of the boundary box divided into a set of voxels of equal-size. The boundary box is always divided into a predetermined number of the voxels independent of the scenes in the first embodiment. However, it is more efficient when the number of voxels varies with the boundary boxes. For this reason, with the image generating apparatus of the second embodiment, optimal values for the size and number of voxels are computed for each boundary box.

Thus, the intersection checking unit 5 and intensity computing unit 7 of the second embodiment respectively include third boundary-box dividing units instead of the first and second boundary-box dividing units. The other components are identical with the first embodiment, and the detailed explained is omitted.

Each third boundary-box dividing unit includes: a third computing unit for computing a total number of the polygons, an area of each polygon, a total area and a mean area of the polygons, and a size of the boundary box based on the data read out by the registered-data reading out unit; an expression-of-relation storage unit for storing an expression of relation that determines the number of division; a fourth computing unit for computing the number of division by substituting the total number and area of the polygons computed by the third computing unit and adequate coefficients into the expression of relation; a second division-processing unit for dividing the boundary box by the number of division computed by the fourth computing unit; a first voxel-intersection checking unit for checking the intersection between the voxels relative to the view point.

More precisely, the third computing unit includes: a fifth computing unit for computing two vectors sharing one vortex from the coordinates of the vortex contained in the polygons' shape data read out by the registered-data reading out unit to further compute the outer product thereof; a polygon-counting unit for counting a total number of the polygons enclosed in the boundary box; a sixth computing unit for computing the mean area of the polygons by dividing the total area of the polygons computed by the third computing unit by the total number of the polygons counted by the polygon-counting unit—the mean area thus computed is deemed as to be the size of the each polygon; and a seventh computing unit for computing a length of a diagonal D of the boundary box with the view point data read out by the view-point data reading out unit using the world coordinates of the boundary box—the diagonal D thus computed is deemed as to be the size of the boundary box.

The expression of relation storage unit stores Expression 1 used to compute the number of division N1 as follows:

$$N1 = K1 \times (\text{polygon size/boundary-box size})^{-1} + K2 \times \ln (\text{the total number of the polygons}) \quad [\text{Expression 1}]$$

The fourth computing unit substitutes the polygon's size, boundary box's size, and the total number of the polygons computed by the third computing unit into Equation 1 to compute N1, wherein the decimal is counted as 1.

The denominator in the first term in the right side represents the ratio of the mean area of the polygons to the size of the boundary box, giving an approximate size of the polygons. The total number of the polygons in the second term of the second side represents a logarithm for the total number of the polygons in the boundary box. Therefore, N1 is directly proportional to the number of the polygons enclosed in the boundary box.

The inventors of the present invention has set a plurality of experimental cases where the polygons were distributed in a different manner in the same boundary box to determine optimal values for the coefficients such that minimize the time for the "rendering". As a result, a value of 0.2 and a value of 2.0 are determined as being the optimal values for K1 and K2, respectively. With these values, N1 in the direction of the world coordinates (X, Y, Z) ranges between 5 and 50, and thus the number of the voxles $5^3$ and $50^3$.

Figure 7:
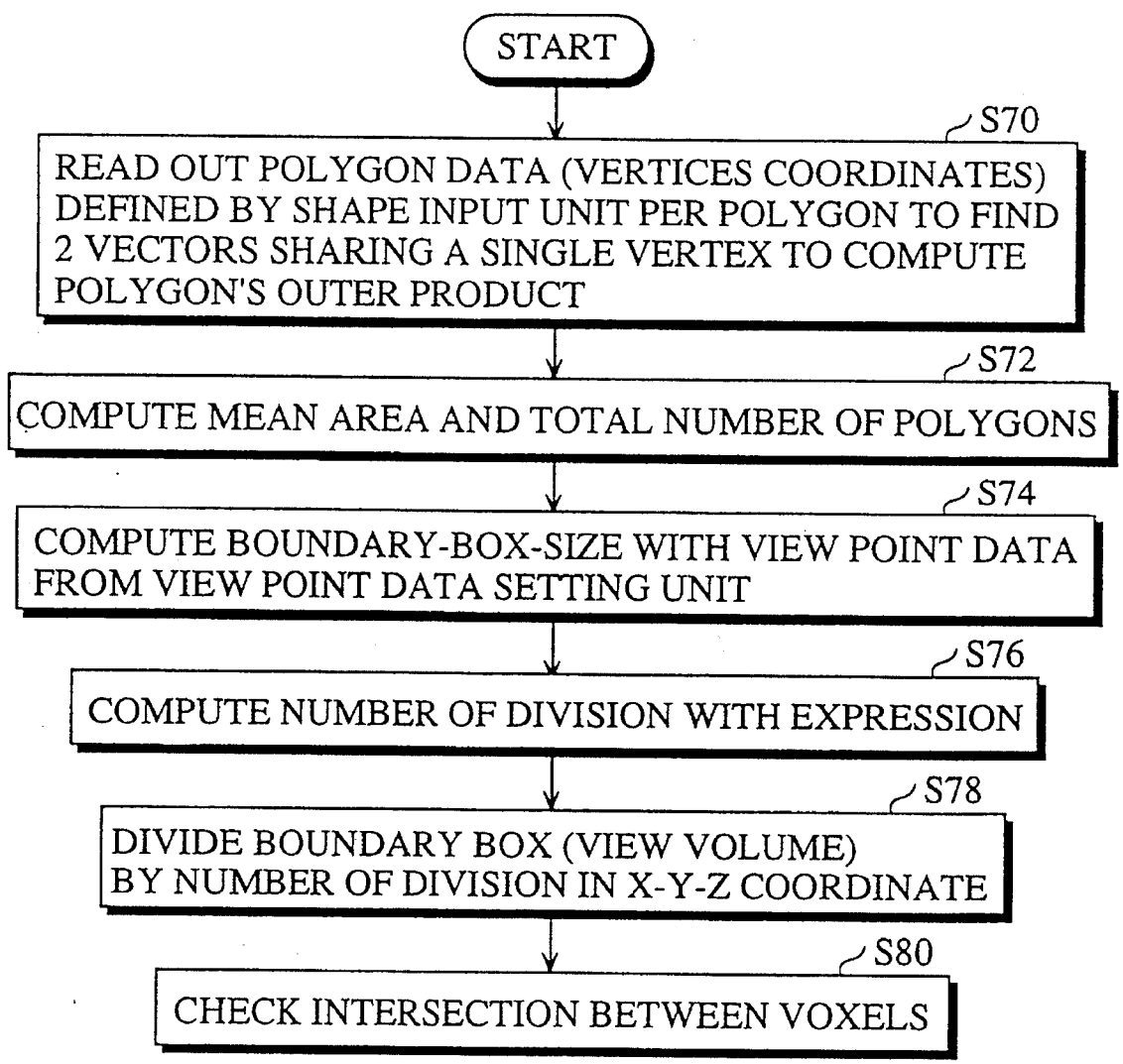
FIG. 7 is a flowchart detailing the boundary-box-dividing operation by the intersection checking unit and intensity computing unit of the second embodiment.

Expression 1 can be used for rendering an image of an object defined by a plurality of curved surfaces, such as an automobile; however, it can be used more efficiently for rendering an object defined by a plurality of linear polygons, such as a kitchen The explanation for the boundary-box dividing operation will be given in the following with referring to FIG. 7. For convenience, only the operation of the third boundary-box-dividing unit will be explained; for the rest is the same as the first embodiment. Note that the third boundary-box-dividing units in the intersection checking unit 5 and intensity computing unit 7 take the same procedure, but they operate independently for Steps 32 through 36 and Steps 37, 38 in FIG. 3, respectively.

The third boundary-box-dividing unit reads out the shape data (vertex coordinates) of each polygon from the shape input unit 1 to find two vectors sharing one vertex to compute the outer product thereof (Step 70). Then, the third boundary-box-dividing unit counts the total number of the polygons and computes the total area of the polygons to compute the mean area of the polygons by dividing the latter by the former (Step 72).

The third boundary-box-dividing unit computes the size of the boundary box with the data read out by the view-point-data reading out unit (Step 74) to compute N1 by Expression 1 (Step 76). Accordingly, the third boundary-box-dividing unit divides the boundary box, or a view volume, by N1 equally in the x, y, z coordinates (Step 78), and checks the intersection between the voxels relative to a view point 64 (Step 80). As a result, it turns out that the voxel 62 and voxel 63 do not intersect relative to the view point 64. Thus, the third boundary-box-dividing unit computes the intensity across the polygons 65, 66 included in the voxels 62, 63 respectively without checking the intersection between the polygons 65, 66 relative to the view point 64, and directly removes the hidden-surfaces. This saves the time required for the intensity-computation significantly compared with the conventional method.

Third Embodiment

Figure 8:
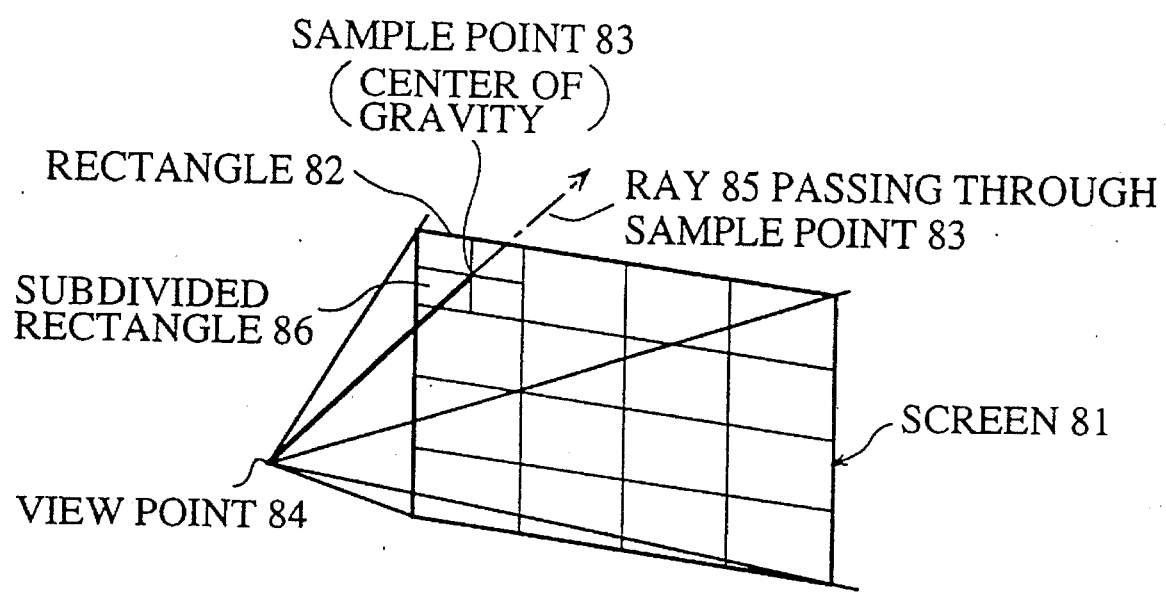
FIG. 8 is a perspective view explaining the boundary-box-dividing operation by an intersection checking unit and an intensity computing unit of the third embodiment.

An image generating apparatus in accordance with the third embodiment of the present invention will be explained with referring to FIG. 8.

The image generating apparatus of the third embodiment is identical with that of the first embodiment except that the first and second boundary-box dividing units in the intersection checking unit 5 and intensity computing unit 7, are respectively replaced with fourth boundary-box-dividing units. Each fourth boundary-box-dividing unit comprises the following components: a third division-processing unit for dividing a screen 81 into a set of rectangles 82 of equal-size in the x, y world coordinates; a second pixel-intersection checking unit for checking the intersection between the polygons and a sample point in each rectangle, such as the center of the gravity, relative to a view point 84; an eighth computing unit for counting the number of the polygons (N2) determined as having the intersections with the sample pixel in each voxel relative to the view point 84 by the pixel intersection checking unit; a ninth computing unit for counting the total number of the polygons enclosed in the boundary box to divide by the number of the rectangles to compute a mean number of the polygons (N3) within each rectangle; a fourth division-processing unit for computing the ratio of N2 to N3 for further dividing each rectangle by $2^n$ when the ratio exceeds 1; a fifth division-processing unit for determining the number of division in z-coordinate in the World system in accordance with the number of division in x, y coordinates computed by the third- and fourth-division processing units; and a third voxel-intersection checking unit for checking the intersection between the voxles relative to the view point 84.

The explanation of the boundary-box-dividing operation by the fourth boundary-box-dividing unit will be given in the following. Like in the second embodiment, only the operation of the fourth boundary-box-dividing unit will be explained for convenience.

First of all, the fourth boundary-box-dividing unit divides the screen 81 into a set of the rectangles 82 of equal-size in the x, y, coordinates in the World system. Then, the fourth boundary-box-dividing unit counts the number of polygons (N2) that intersect with a ray 85 emanating from the view point 84 with respect to the sample point 83. The fourth boundary-box-dividing unit also counts the total number of the polygons in the boundary box being projected on the screen 81, which is divided by the number of the rectangles (herein 16) to compute a mean number of the polygons (N3). When the obtained ratio exceeds a value of 1, the fourth boundary-box-dividing unit computes the ratio of N2 to N3 for subdividing the rectangle by $2^n$, where a value of n is gradually increased. For example, when the obtained ratio exceeds a value of 1 slightly, the intersection checking unit 5 subdivides the rectangle by 4. Then, the fourth boundary-box-dividing unit again computes N2 with respect to a sample point in each subdivided rectangle 86 to compute the ratio of newly obtained N2 to N3. When the newly obtained N2 is still larger than N3 (N2>N3), the rectangles 86 are further broken into a greater number of smaller rectangles.

With the above operation, the size of the voxels can be adequately arranged to the number of the polygons enclosed in the boundary box.

Subsequently, the fourth boundary-box-dividing unit determines the number of division in z-coordinate, using the number of division x, y coordinates to divide the boundary box into a set of voxels of an optimal size to check an intersection between the resulting voxels relative to the view point 84.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image generating apparatus for generating a realistic 2D image using a 3D model constructed by a computer, the image generating apparatus comprising:

a 3D model dividing means for dividing a 3D model of an object into a plurality of polygons to define a spatial-occupancy of the 3D model;

a light-source-data setting means for setting data related to at least one light source that illuminates the polygons;

an intersection-checking means for checking the polygons of the 3D model to find a polygon which is not illuminated by any light source; and an intensity computing means for computing intensity across visible polygons by one of a ray-tracing method and a radiosity method with the use of the light source data and the view point data, wherein the intersection checking means includes:

a boundary box dividing unit for dividing a boundary box enclosing all the polygons into a plurality of voxels, the boundary box dividing unit being characterized in that it determines the number of division N1 for the boundary box using the equation:

$$N1 = K1 \cdot (\text{polygon size/size of boundary box})^{-1} + K2 \cdot 1n \text{ (total no. of polygons)}$$

wherein K1 and K2 are constants which are each assigned a respective appropriate value based on a shape of a polygon; and an intersection checking unit for checking an intersection between the voxels relative to the light source.

2. The image generating apparatus of claim 1, wherein the intersection checking means is characterized in that it subdivides each rectangle by $2^n$, wherein a value of n is decided as a value in a range between 0 and a value which gives a result wherein a number of rectangles is less than or equal to a number of pixels on the screen.

3. An image generating apparatus comprising:

a shape input unit for dividing an object into a set of polygons to define a spatial-occupancy of the object;

a view-point-data setting unit for determining data related to a view point from which the polygons inputted with the shape input unit are observed;

an attribute-data-setting unit for setting data related to a physical-property attribute of each polygon;

a light-source-data setting unit for setting data related to a light source illuminating the polygons;

an intersection checking means for checking an intersection between the polygons supplied from the shape input means relative to the light source; and an intensity computing means for computing intensity across each polygon by using the polygon's physical-property attribute date when no ray emanating from the light source through the polygon is intercepted by any other polygons, computing by means of parallel processing using a plurality of processors wherein a plurality of processing units known as threads are allocated among all of the processors, wherein the intersection checking means is characterized in that it creates a boundary box enclosing all the objects prior to the intersection check for an arbitrary polygon, computes conditions for dividing the boundary box for the intersection check using a total number of the polygons within the boundary box, a mean area of the polygons, and a size of the boundary space as parameters, and determines a division for the boundary box with optimal coefficients computed in advance with a plurality of experimental scenes under the following equation obtained as a result of the experiments, wherein $$N1 = K1 \cdot (\text{polygon size/size of boundary box})^{-1} + K2 \cdot 1n \text{ (total no. of polygons)}$$

wherein $K1$ and $K2$ are constants which are each assigned a respective appropriate value based on a shape of a polygon.

4. The image generating apparatus of claim 3 wherein the intersection checking means divides the polygon into a set of the segments along a scan line to select an adjacent pixel one after another from the pixels along the scan line.

5. The image generating apparatus of claim 4, wherein the intersection checking means includes a segment buffer which registers the intersection data per segment.

6. The image generating apparatus of claim 5, wherein the intersection checking means generates the intersection data per segment for each light source to register the generated data.

7. The image generating apparatus of claim 6, wherein the intersection-data registering unit includes an updating unit for updating the intersection data each time a new ray-intercepting polygon is checked during the ray-interception check by the checking unit for one segment.

8. The image generating apparatus of claim 6, wherein the segment buffer comprises a set of threads assigned with their respective identification codes to store the intersection data of each segment into a thread identified by their respective identification codes, whereby the intersection data of each segment on one polygon are processed in parallel by a plurality of processors equipped with the image generating apparatus.

9. The image generating apparatus of claim 3, further comprising a display means for displaying only the visible polygons seen from the light source based on a result of the intersection-check by the intersection checking means.

* * * * *